United States Patent [19]

Payne et al.

[11] 4,218,723
[45] * Aug. 19, 1980

[54] HETEROPHASIC CERAMIC COMPOSITION

[75] Inventors: David A. Payne, Champaign; Sang M. Park, Urbana, both of Ill.

[73] Assignee: University of Illinois Foundation, Urbana, Ill.

[*] Notice: The portion of the term of this patent subsequent to Jun. 19, 1996, has been disclaimed.

[21] Appl. No.: 24,099

[22] Filed: Mar. 26, 1979

Related U.S. Application Data

[63] Continuation-in-part of Ser. No. 847,588, Nov. 1, 1977, Pat. No. 4,158,219.

[51] Int. Cl.² ............... C04B 35/00; C04B 35/46
[52] U.S. Cl. ........................ 361/321; 106/46; 106/49; 106/53; 106/73.31; 252/520; 264/56
[58] Field of Search .............. 106/73.31, 49, 53, 47 R; 252/520; 264/56; 361/321

[56] References Cited

U.S. PATENT DOCUMENTS

| | | | |
|---|---|---|---|
| 1,607,817 | 11/1926 | Dennis | 106/47 R |
| 3,577,487 | 5/1971 | Sanchez et al. | 264/56 |
| 3,977,887 | 8/1976 | McIntosh | 106/73.31 |
| 4,066,426 | 1/1978 | Maher | 106/73.31 X |
| 4,158,219 | 6/1979 | Payne et al. | 106/73.31 X |

OTHER PUBLICATIONS

Rawson, H., *Inorganic Glass–Forming Systems*, pub. 1967, Academic Press, N.Y., p. 178.
Rusinko, "Dielectric Mixing in the PLZT–$Pb_5Ge_3O_{11}$ System," Thesis Penn. State College of Earth & Mineral Sciences, May, 1975, pp. 3, 5, 10.

*Primary Examiner*—Helen M. McCarthy
*Attorney, Agent, or Firm*—Mathew L. Kalinowski

[57] ABSTRACT

Liquid phase sintering of a mixture comprising a major amount of barium titanate and a minor amount of a lead germanate composition at temperatures in the range of from about 750° to about 1050° C. provides a heterophasic ceramic body of high dielectric constant and strength, and low dissipation factor. Consequently, relatively inexpensive low melting point metals such as silver and copper can be utilized as electrodes in the fabrication of monolithic multi-layer capacitors.

3 Claims, 3 Drawing Figures

SYSTEM $PbO-GeO_2$

SYSTEM PbO-GeO₂

HETEROPHASIC CERAMIC COMPOSITION

This is a continuation-in-part of application Ser. No. 847,588 filed Nov. 1, 1977, now U.S. Pat. No. 4,158,219.

This invention relates to novel ceramic compositions, to methods for producing them, and to ceramic capacitors utilizing such compositions. More specifically, this invention relates to barium titanate-lead germanate compositions that can be fired at from about 750° to about 1050° C. to provide heterophasic ceramic bodies of high dielectric strength and low dissipation factor. The relatively low firing temperature permits use of inexpensive, non-noble metals and alloys thereof as electrodes in the fabrication of monolithic multi-layer capacitors.

In modern electronic circuitry where high volumetric efficiency in capacitance is required, miniturized capacitors based on high dielectric constant materials are increasingly important. Most representative of all high dielectric ceramics is barium titanate, a material that offers a wide range of applications in the fabrication of monolithic multi-layer ceramic capacitors. Such multi-layer capacitors are well known in the art and comprise alternate layers of a ceramic dielectric and metal electrodes, bonded together in a monolithic structure. Alternate electrodes are connected together at one end of the structure and the other electrodes are connected together at the other end. Usually, the electrodes are connected together by a metal terminal applied to the ends of the structure. In the firing of such structures based upon conventional barium titanate ceramics, temperatures of the order of 1300°–1400° C. are required, and at these high temperatures in air expensive electrode systems utilizing the noble metals such as platinum and palladium must be used.

It is therefore an object of this invention to provide a barium titanate ceramic composition that can be fired at relatively low temperatures.

Another object of this invention is to provide, by liquid phase sintering, a heterophasic barium titanate-lead germanate composition of high dielectric strength and low dissipation factor.

Still another object is to produce multi-layer monolithic ceramic capacitors fabricated in air with inexpensive non-noble metals and alloys thereof. These and other objects will appear in the course of the following description and examples.

SUMMARY OF THE INVENTION

Figure 1:
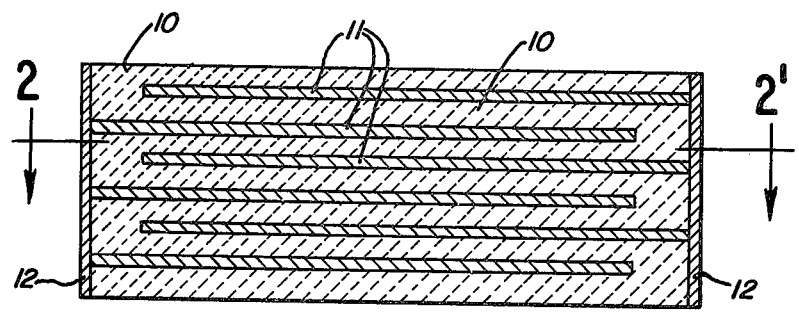
FIG. 1 is a cross-sectional view of the monolithic multi-layer capacitor of this invention having alternate layers of ceramic dielectric 10, staggered electrodes 11, and terminal contact electrodes 12 at each end.
Figure 2:
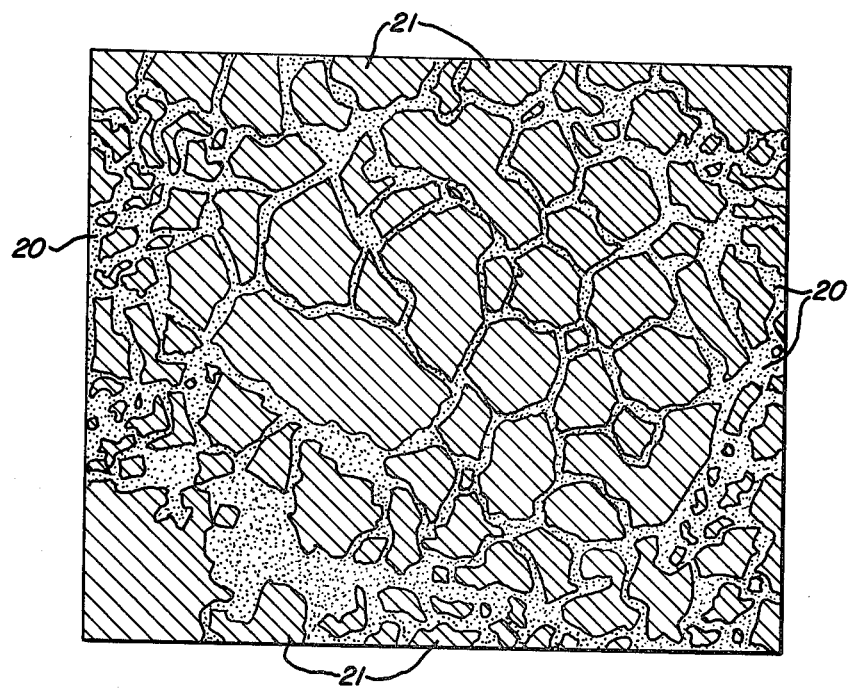
FIG. 2 is a sectional view of the ceramic dielectric of FIG. 1 taken along the axis 2—2′. Illustrated is the heterophasic microstructure of the mature ceramic comprising a continuous lead germanate derived phase 20 and a discrete barium titanate phase 21.

For the practice of this invention, the system barium titanate-lead germanate was found to be particularly suitable. For example, BaTiO$_3$ of from about 1 to about 10 micron particle size is admixed with from about 1 to about 33, preferably from about 5 to about 25, volume % of a lead germanate composition; minor amounts of other ceramic materials can be incorporated in the mixture, for example, up to about 25 volume % of one or more of the following: SrTiO$_3$, CaZrO$_3$, and the like. After the ceramic body is formed, a metal electrode of silver, copper, aluminum, iron, cobalt, nickel, or mixtures thereof is deposited thereon and multiple layers of the combination are stacked and pressed into a monolithic capacitor structure. The green ceramic structure is then fired, usually in air, for generally from about 1 to about 60, typically from about 2 to about 45, and preferably from about 2 to about 20 minutes, at a temperature of generally from about 750° to about 1050°, typically from about 800° to about 1000°, and preferably from about 850° to about 950° C. If firing temperatures substantially in excess of about 1050° C. were used, relatively inexpensive, non-noble metals and alloys thereof could not be used in the fabrication of monolithic multi-layer capacitors. Temperatures substantially below about 750° C. are either not effective or require excessively long firing times.

Although firing temperatures and time for firing are interrelated (i.e., the higher the firing temperature, the shorter the firing time, and vice versa), it has been found that firing times in excess of about 60 minutes are unnecessary and uneconomical. Firing times substantially less than about 1 minute are not effective to produce the desired result even at relatively high firing temperatures.

Firing of the ceramic structure can also be carried out in controlled atmospheres, for example in an atmosphere having a low partial pressure of oxygen. Consolidation, or densification, of the ceramic occurs by liquid phase sintering to yield a pore-free, heterophasic structure in which a continuous intergranular lead germanate derived phase separates the major barium titanate phase into discrete localized volumes. Under the above-described conditions, there is essentially no reaction between the bariumtitanate phase and the lead germanate derived phase.

In the barium titanate-lead germanate system it was found that the degree of densification increased with the amount of liquid phase present. Dielectric constant, however, decreased with increasing amounts of liquid phase. By considering both dielectric and densification characteristics, the preferred amount of liquid phase for rapid sintering at 1000° C. was found to be from about 10 to about 15 volume %, which provided a ceramic having dielectric constant vlues in the range of from about 1000 to about 1500.

The term "lead germanate" in this specification is meant to include lead and germanium containing compounds such as Pb$_5$Ge$_3$O$_{11}$, and lead, germanium, and silicon containing compounds as defined by the formula:

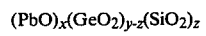

$$(PbO)_x(GeO_2)_{y-z}(SiO_2)_z$$

where $1 < x \leq 6$, y ranges from 1 to 3, and the sum of $y+z$ is $\leq 3$. Mixtures of two or more compounds can also be used.

Figure 3:
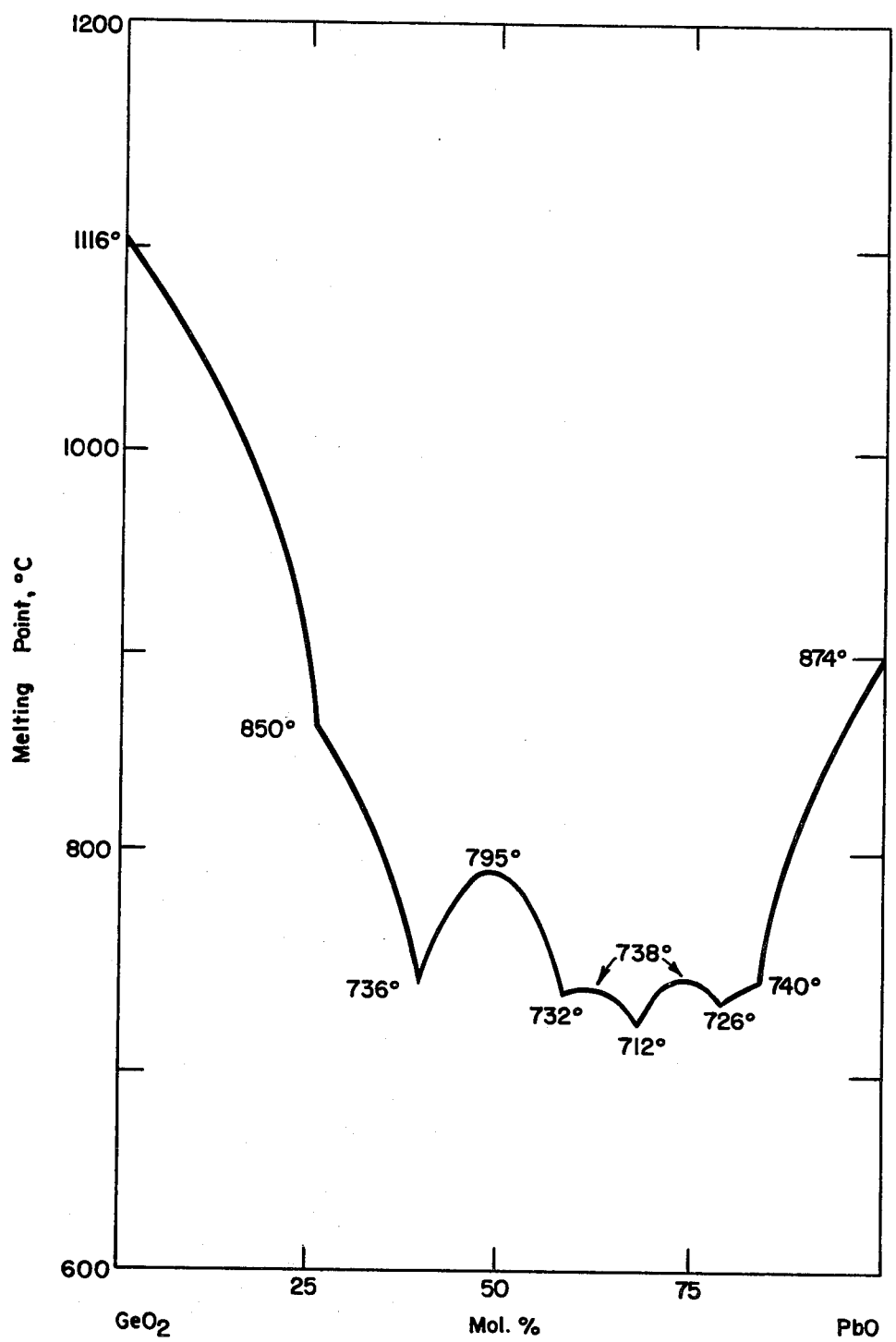
FIG. 3 is a phase diagram of the PbO—GeO$_2$ system showing the melting points of various lead germanate compositions.

Lead germanate compositions suitable for the liquid phase sintering step can be prepared by heating various mixtures of PbO and GeO$_2$ up to temperatures of about 1000° C. The phase diagram in FIG. 3 shows the melting points for various molar ratios of PbO and GeO$_2$. For the purposes of this invention, lead germanate compositions having melting points below about 850° C. are preferred. Because of the relatively high cost of $GeO_2$ a portion of it can be replaced advantageously with $SiO_2$.

The lead germanate composition having the formula $Pb_5Ge_3O_{11}$ is a preferred composition because it melts congruently (i.e., solid and liquid phases have identical compositions) to provide a low viscosity melt which is advantageous for rapid and complete liquid phase sintering. The composition is prepared by heating in a platinum crucible at about 750° C. 5 moles of PbO and 3 moles of $GeO_2$ until a clear liquid is formed. The cooled product, having the formula $Pb_5Ge_3O_{11}$, is crushed and powdered in a mortar and pestle, screened through a 325 mesh sieve, and further reduced by ball milling. The final powder has a particle size ranging from about 0.5 to about 50 microns with the greatest concentration at about 5 microns.

DESCRIPTION OF THE PREFERRED EMBODIMENTS

The following description and data are presented to illustrate the practice and advantages of the instant invention. The materials used were reagent grade PbO and $GeO_2$, and research grade $BaTiO_3$. The lead germanate composition was prepared as described above. The research grade $BaTiO_3$ had an average particle size of about 1 micron.

For the purpose of measuring electrical properties, $BaTiO_3$ was admixed with 10, 20, and 30 volume % of $Pb_5Ge_3O_{11}$. Pellets 1.25 cm in diameter and 0.2 cm thick were prepared in a die by dry pressing at a pressure of 30,000 psi. The pellets were sintered isothermally at 850°, 900°, 950°, 1000°, and 1050° C. for 5 minutes. Quick air-drying silver paste was used to provide electrodes on the surface of the specimens.

Capacitance and dissipation factor were measured over a temperature range of 25° to 160° C. Ratings were recorded at 100 KHz. The weak field signal voltage applied across the specimens was 0.5 volts r.m.s.

Table I lists dielectric constants, K′, and dissipation factors, tan, for $BaTiO_3$-$Pb_5Ge_3O_{11}$ ceramic compositions containing 10, 20, and 30 volume % of $Pb_5Ge_3O_{11}$ sintered at 950° C. These data illustrate that low temperature sintering of the compositions of this invention provides ceramic capacitors possessing excellent electrical characteristics.

TABLE I

Dielectric Measurements on Liquid Phase Sintered $BaTiO_3$(1 micron) + $Pb_5Ge_3O_{11}$ (X)
$T_s$ = 950° C., $t_s$ = 5 min. 100 KHz

| | X = 10 Vol. % | | X = 20 Vol. % | | X = 30 Vol. % | |
|---|---|---|---|---|---|---|
| T(°C.) | K′ | tan δ | K′ | tan δ | K′ | tan δ |
| 25 | 1210 | 0.012 | 825 | 0.016 | 490 | 0.016 |
| 60 | 1180 | 0.010 | 822 | 0.017 | 495 | 0.015 |
| 70 | 1176 | 0.009 | — | — | — | — |
| 80 | 1205 | 0.009 | 828 | 0.013 | 498 | 0.0156 |
| 90 | 1248 | 0.009 | 841 | 0.014 | — | — |
| 100 | 1302 | 0.009 | 885 | 0.012 | 516 | 0.016 |
| 110 | 1387 | 0.0096 | 950 | 0.014 | 526 | 0.016 |
| 120 | 1440 | 0.0095 | 954 | 0.012 | 544 | 0.016 |
| 130 | 1319 | 0.009 | 911 | 0.011 | 537 | 0.016 |
| 140 | 1193 | 0.010 | 844 | 0.013 | 514 | 0.015 |
| 160 | 1000 | 0.012 | — | — | 467 | 0.020 |

Table II lists dielectric constant and dissipation factor measurements for a $BaTiO_3$-10 Vol.% $Pb_5Ge_3O_{11}$ composition sintered at temperatures in the range of 850°-1050° C. These data illustrate that especially good electrical characteristics are obtained with sintering temperatures at the high end of the range 850°-1050° C. Satisfactory electrical properties, however, are obtained over the entire range of sintering temperatures.

Table III lists comparative data for ceramic compositions liquid phase sintered at 900° C. for 20 minutes with $PbGeO_3$ derived from $(PbO)(GeO_2)$; $Pb_5Ge_3O_{11}$ derived from $(PbO)_5(GeO_2)_3$; $Pb_5Ge_2SiO_{11}$ derived from $(PbO)_5(GeO_2)_2SiO_2$; and $Pb_5GeSi_2O_{11}$ derived from $(PbO)_5(GeO_2)(SiO_2)_2$.

The data illustrate that ceramic compositions with excellent electrical properties can be obtained by liquid phase sintering with various lead germanate compositions and various lead germanate-silicate compositions.

Although this invention has been disclosed with particular reference to certain preferred embodiments thereof, it is understood that variations and modifications can be effected within the spirit and scope of the appended claims. It is intended that all matter contained in the above description and tables or shown in the accompanying drawings shall be interpreted in an illustrative and not in a limiting sense.

TABLE II

Dielectric Measurements on Liquid Phase Sintered $BaTiO_3$ (1 micron) + 10 Vol. % $Pb_5Ge_3O_{11}$
$t_s$ = 5 min.

| | $T_s$ = 850° C. | | $T_s$ = 900° C. | | $T_s$ = 950° C. | | $T_s$ = 1000° C. | | $T_s$ = 1050° C. | |
|---|---|---|---|---|---|---|---|---|---|---|
| T(°C.) | K′ | tan δ | K′ | tan δ | K′ | tan δ | K′ | tan δ | K′ | tan δ |
| 25 | 868 | 0.0125 | 963 | 0.012 | 1210 | 0.012 | 1315 | 0.021 | 1430 | 0.024 |
| 60 | 840 | 0.0085 | 945 | 0.009 | 1180 | 0.010 | 1310 | 0.016 | 1428 | 0.0175 |
| 70 | 858 | 0.009 | — | — | 1176 | 0.009 | 1300 | 0.015 | — | — |
| 80 | 867 | 0.010 | — | — | 1205 | 0.009 | — | — | 1425 | 0.015 |
| 90 | 875 | 0.011 | 968 | 0.01 | 1248 | 0.009 | — | — | 1478 | 0.014 |
| 100 | 881 | 0.011 | 1031 | 0.0103 | 1302 | 0.009 | 1367 | 0.014 | 1575 | 0.015 |
| 110 | 940 | 0.012 | 1114 | 0.0120 | 1387 | 0.0096 | 1475 | 0.014 | 1775 | 0.015 |
| 120 | 983 | 0.0135 | 1157 | 0.0135 | 1440 | 0.0095 | 1566 | 0.015 | 1830 | 0.0143 |
| 130 | 930 | 0.016 | 1075 | 0.015 | 1319 | 0.009 | 1480 | 0.016 | 1682 | 0.013 |
| 140 | 858 | 0.018 | 983 | 0.015 | 1193 | 0.010 | 1350 | 0.013 | 1500 | 0.013 |
| 160 | 738 | 0.023 | 837 | 0.017 | 1000 | 0.012 | 1130 | 0.018 | 1240 | 0.013 |

TABLE III

Dielectric Measurements on Liquid Phase Sintered $BaTiO_3$
$T_s = 900°$ C.    $t_s = +$min.

| T(°C.) | $BaTiO_3$ + 10% $PbGeO_3$ | | $BaTiO_3$ + 10% $Pb_5Ge_3O_{11}$ | | $BaTiO_3$ + 10% $Pb_5Ge_2SiO_{11}$ | | $BaTiO_3$ + 10% $Pb_5GeSi_2O_{11}$ | |
|---|---|---|---|---|---|---|---|---|
| | K' | tan δ | K' | tan δ | K' | tan δ | K' | tan δ |
| 25 | 1068 | 1.8 | 1075 | 2.0 | 903 | 1.7 | 907 | 1.6 |
| 40 | — | — | 1092 | 1.9 | 910 | 1.6 | 904 | 1.3 |
| 60 | 1075 | 1.7 | 1124 | 2.1 | 924 | 1.6 | 928 | 1.3 |
| 80 | 1080 | 1.4 | 1167 | 2.3 | 954 | 1.7 | 950 | 1.3 |
| 100 | 1135 | 1.4 | 1215 | 2.2 | 1034 | 1.7 | 1015 | 1.4 |
| 120 | 1312 | 1.4 | 1422 | 2.1 | 1105 | 1.4 | 1095 | 1.3 |
| 140 | 1150 | 1.2 | 1300 | 2.3 | 1067 | 1.5 | 1092 | 1.2 |
| 160 | — | — | 1085 | 2.3 | 978 | 1.6 | 920 | 1.4 |

What is claimed is:

1. A heterophasic ceramic composition consisting essentially of a major amount of barium titanate and from about 1 to about 33 volume % of a lead germanate composition having the formula $$(PbO)_x(GeO_2)_{y-z}(SiO_2)_z$$

where $1 < x \leq 6$, y ranges from 1 to 3, and the sum of y+z is $\leq 3$, the ceramic composition being characterized in that densification is effected by liquid phase sintering at a temperature in the range of from about 750° to about 1050° C. to yield the heterophasic structure in which the lead germanate composition provides a continuous intergranular phase which separates the barium titanate phase into discrete localized volumes.

2. The composition of claim 1 in which the lead germanate composition is $Pb_5Ge_3O_{11}$ present at from about 5 to about 25 volume %.

3. A high dielectric constant ceramic capacitor comprising the heterophasic ceramic body in accordance with claim 1 and electrode metal.

* * * * *